United States Patent
Ater et al.

(10) Patent No.: US 12,556,835 B2
(45) Date of Patent: Feb. 17, 2026

(54) COMPENSATION OF IMAGING SENSOR

(71) Applicant: SAMSUNG ELECTRONICS CO., LTD., Suwon-si (KR)

(72) Inventors: Yotam Ater, Tel-Aviv (IL); Ortal Glatt, Tel-Aviv (IL); Woo-Shik Kim, Tel-Aviv (IL); Heejin Choi, Tel-Aviv (IL); Evgeny Soloveichik, Tel-Aviv (IL); Natan Bibelnik, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 18/059,591

(22) Filed: Nov. 29, 2022

(65) Prior Publication Data

US 2024/0179428 A1 May 30, 2024

(51) Int. Cl.
*H04N 25/61* (2023.01)
*G06T 5/60* (2024.01)
*H04N 25/131* (2023.01)

(52) U.S. Cl.
CPC ............ *H04N 25/61* (2023.01); *G06T 5/60* (2024.01); *H04N 25/131* (2023.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 5,790,692 A * | 8/1998 | Price | G01N 15/147 382/265 |
| 7,456,878 B1 | 11/2008 | Sun et al. | |
| 9,467,677 B2 | 10/2016 | Hyodo | |
| 10,989,595 B2 | 4/2021 | Balas | |
| 11,237,111 B2 | 2/2022 | Cheng et al. | |
| 2009/0156900 A1 * | 6/2009 | Robertson | A61B 1/00186 600/160 |
| 2020/0134794 A1 * | 4/2020 | Chesnokov | H04N 25/61 |
| 2021/0334587 A1 * | 10/2021 | Wang | G06T 7/001 |
| 2021/0372853 A1 | 12/2021 | Borremans et al. | |
| 2023/0024955 A1 * | 1/2023 | Kumar | G06T 7/0002 |
| 2023/0079742 A1 * | 3/2023 | Rutel | G06V 20/50 702/116 |

FOREIGN PATENT DOCUMENTS

| CN | 112435177 A * | 3/2021 | ............ G06T 5/006 |
|---|---|---|---|
| WO | 2021028366 | 2/2021 | |

OTHER PUBLICATIONS

English translation of CN-112435177-A, Feng, 2021 (Year: 2021).*
(Continued)

*Primary Examiner* — James M Hannett
(74) *Attorney, Agent, or Firm* — Morgan, Lewis & Bockius LLP

(57) ABSTRACT

An image processing unit includes an imaging sensor having a pixel array, a memory storing an artificial neural network (ANN), and an image signal processor configured to operate the ANN on an image output by the imaging sensor to predict an error value of a pixel of the image and correct the pixel using the predicted error value.

17 Claims, 13 Drawing Sheets

(56) References Cited

OTHER PUBLICATIONS

Rosanne Liu et al., "An intriguing failing of convolutional neural networks and the CoordConv solution", 32nd Conference on Neural Information Processing System (NeurIPS 2018), Montreal, Canada.
Vincent Sauget, et al., "Application note for CMS camera and CMS sensor users: Post-processing method for crosstalk reduction in multispectral data and images", SILIOS Technologies, May 14, 2016.
Dijkstra, Klaas, et al., "Hyperspectral demosaicking and crosstalk correction using deep learning", 2018, https://doi.org/10.1007/s00138-018-0965-4.
Kaiming He, et al., "Deep Residual Learning for Image Recognition", https://arxiv.org/pdf/1512.03385.pdf, Dec. 10, 2015.

* cited by examiner

FIG. 4

| F7 (520nm) | F8 (540nm) | F15 (680nm) | F16 (700nm) |
|---|---|---|---|
| F5 (480nm) | F6 (500nm) | F13 (640nm) | F14 (660nm) |
| F3 (440nm) | F4 (460nm) | F11 (600nm) | F12 (620nm) |
| F1 (400nm) | F2 (420nm) | F9 (560nm) | F10 (580nm) |

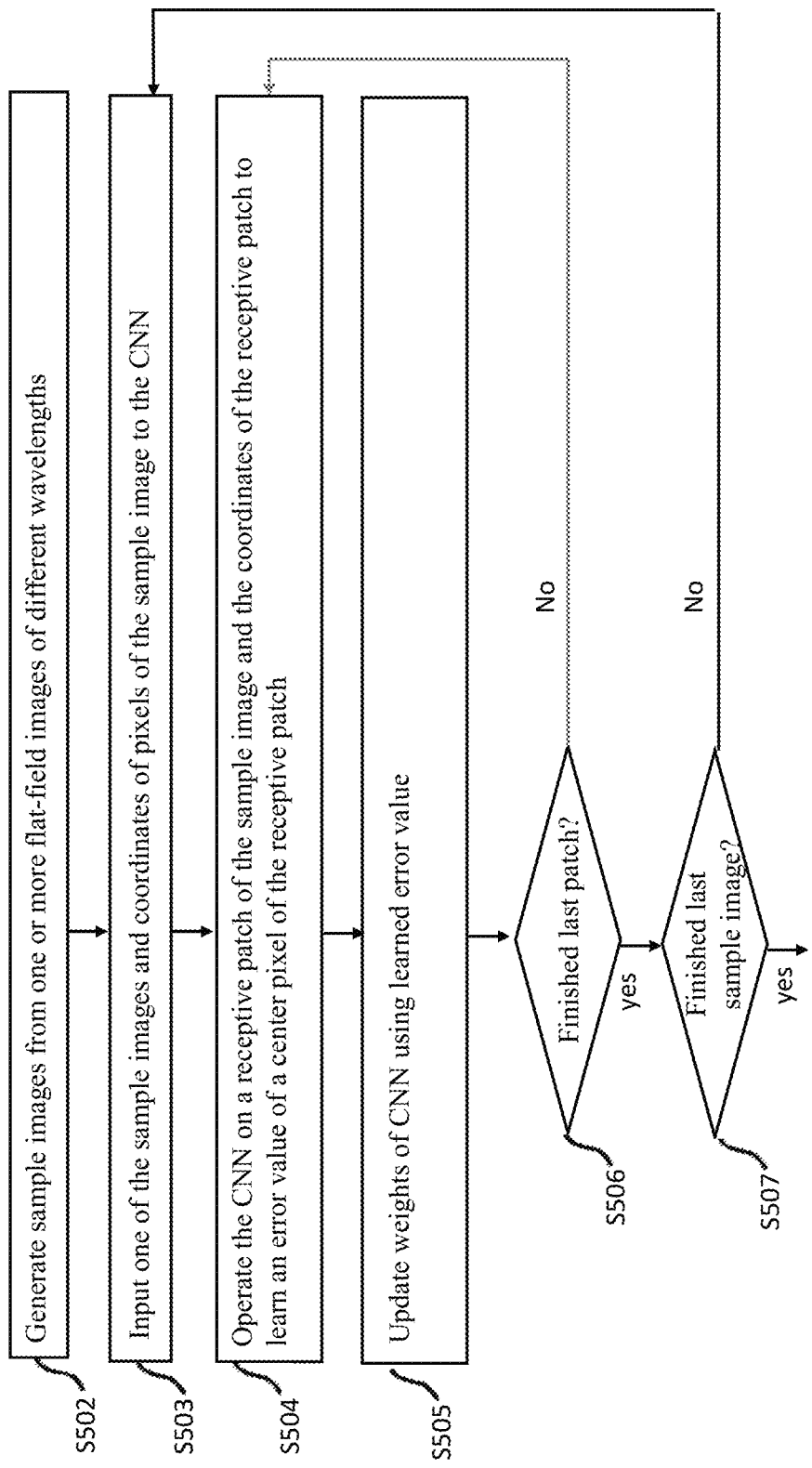

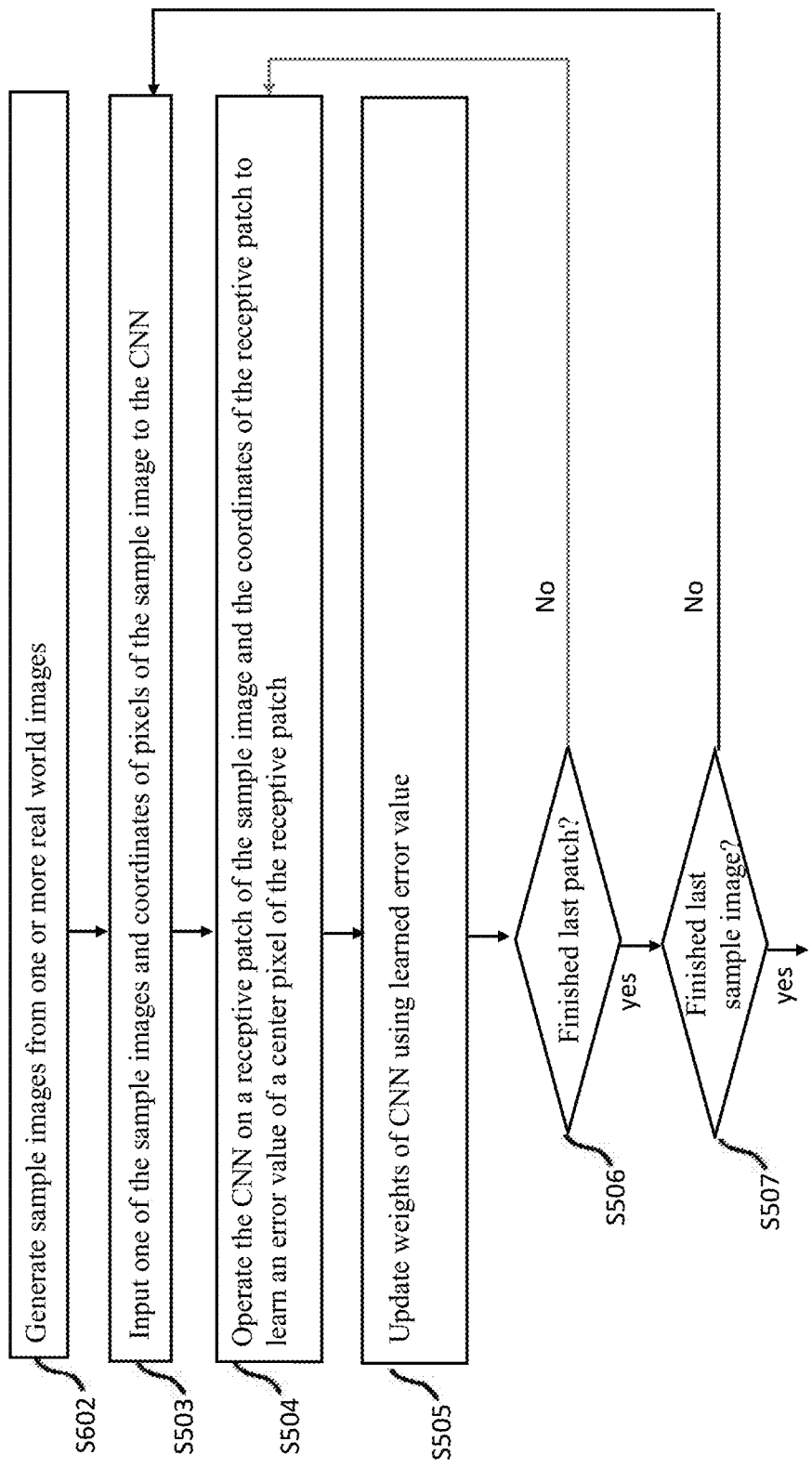

COMPENSATION OF IMAGING SENSOR

1. TECHNICAL FIELD

Exemplary embodiments of the present inventive concept relate to image sensors, and more particularly to compensation of imaging sensors using artificial neural networks.

2. DISCUSSION OF RELATED ART

Image sensors capture a two-dimensional (2D) or three-dimensional (3D) image of an object. Image sensors generate an image of an object using a photoelectric conversion element, which reacts to the intensity of light reflected from the object. With the recent development of complementary metal-oxide semiconductor (CMOS) technology, a CMOS image sensor (CIS) using CMOS has been widely used.

The CIS may be configured as a multi-spectral imaging sensor (MIS) to capture image data within specific wavelength ranges across the electromagnetic spectrum to generate MIS images. The captured image data typically passes through an image processing chain that performs corrections on the image to data to generate the MIS images.

Cross-talk is any phenomenon by which a signal transmitted on one circuit or channel creates an undesired effect in another circuit or channel. For example, cross-talk may occur in an MIS due to unintended optical paths, optical scattering at interfaces, and charge drift across diode boundaries.

A chief ray is the ray from an off-axis object that passes through the center of an aperture stop of an optical system (e.g., a camera). The chief ray enters the optical system along a line directed towards the midpoint of the entrance pupil, and then leaves the system along a line passing through the center of the exit pupil. The angle between the optical axis and the chief ray may be referred to as a chief ray angle (CRA).

A filter may be used in a CIS to generate a MIS. The spectral response of the filter may change as the angle of incident illumination is increased from zero degree. This effect, coupled with the CRA, leads to pixels in the same MIS channel having different spectral response as a function of their location on the sensor, and may be referred to as a CRA shift.

However, it may be difficult to perform corrections on image data in an MIS since MIS images can be more greatly affected by cross-talk and CRA shift.

SUMMARY

According to an exemplary embodiment of the disclosure, an image processing unit is provided that includes an image sensor having a pixel array, a memory storing an artificial neural network (ANN), and an image signal processor configured to operate the ANN on an image output by the image sensor to predict an error value of a pixel of the image and correct the pixel using the predicted error value.

According to an exemplary embodiment of the disclosure, a method for correcting an image captured by an imaging sensor is provided. The method includes: training an artificial neural network (ANN) to predict an error value of a pixel in an image using a training patch of a training image; operating the ANN on a new image output by the MIS sensor to determine error values of the new image; and correcting the new image using the determined error values.

According to an exemplary embodiment of the disclosure, an image signal processing unit is provided. The image signal processing unit is configured to train an artificial neural network (ANN) on patches of flat-field images and patches of read-world images to predict an error value in a pixel of an image, operate the trained ANN on an input image to output error values, and correct the input image using the error values.

BRIEF DESCRIPTION OF THE DRAWINGS

The present inventive concept will become more apparent by describing in detail exemplary embodiments thereof with reference to the attached drawings, in which:

FIG. 4 illustrates an exemplary spectral filter of the image sensor;

FIG. 10 illustrates a method for training the CNN according to an exemplary embodiment of the inventive concept;

FIG. 11 illustrates a method for training the CNN according to an exemplary embodiment of the inventive concept;

DETAILED DESCRIPTION

Figure 1:
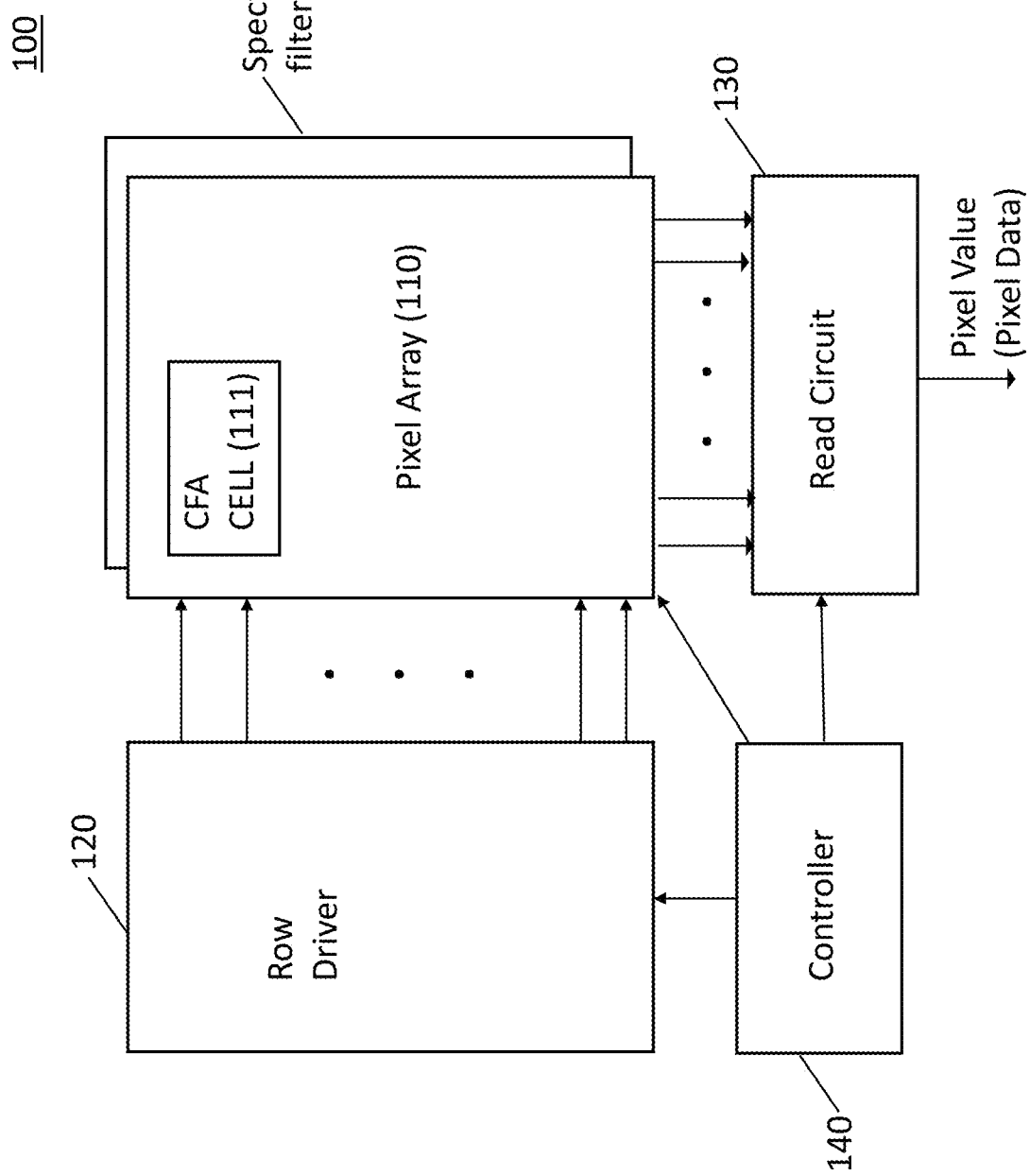
FIG. 1 is a block diagram of an image sensor including a pixel array, according to an exemplary embodiment of the present inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 is a block diagram of a multi-spectral imaging sensor (MIS), according to an example embodiment of the inventive concept. While the description below focuses on an MIS, the inventive concept is not limited thereto and may be applied to CIS or CCD based non-multi-spectral imaging sensor.

Referring to FIG. 1, an MIS 100 may include a pixel array 110, a spectral filter 150, a row driver 120, a read circuit 130, and a controller 140. The MIS 100 may be a complementary metal-oxide semiconductor (CMOS) image sensor (CIS) or charged coupled device (CCD) image sensor. In an alternate embodiment, the spectral filter 150 is omitted to convert the MIS 100 into a CIS or CCD based non-multi-spectral imaging sensor.

For example, the MIS 100 may include 16 channels, 32 channels, etc. A bandwidth of each channel may be set less than red (R), green (G), and blue (B) bands. A total bandwidth of all channels may include an RGB bandwidth, which is a visible light bandwidth. The total bandwidth may be wider than a visible light bandwidth in an alternate embodiment to include ultraviolet light and/or infrared light. For example, the total bandwidth may have a bandwidth of about 350 nanometer (nm) to about 1000 nm.

An MIS image obtained by the MIS 100 may be a hyperspectral image that includes a wavelength band that is greater than an RGB wavelength band or a visible light band. For example, the MIS image may be a wavelength-based image in which an ultraviolet to infrared wavelength band is divided into 16 or more channels. The MIS image may be an image obtained by using all available channels of the MIS 100, or may be an image obtained by selecting a specific channel. When the spectral filter 150 is omitted, the MIS image may be replaced with a non-multi-spectral image referred to as an image.

The spectral filter 150 may include a plurality of unit filters that transmit light of different wavelength ranges and are arranged in two dimensions. The controller 140 may control the row driver 120 and the read circuit 130. The pixel array 110 may include a plurality of pixels (e.g., color pixels). Each of the pixels may include at least one photosensitive element for detecting light of different wavelengths that pass through the unit filters. The photosensitive element may sense light in each pixel and generate an electrical signal according to the intensity of the sensed light. The photosensitive element may include a photodiode, a photogate, a phototransistor, or the like. The pixel array 110 may include color pixels in various patterns, according to example embodiments. Each of the color pixels may generate, as a pixel signal, an electrical signal related to at least one color.

The pixel array 110 may output an electrical signal, which corresponds to light absorbed by the photosensitive element, to the read circuit 130. The row driver 120 may output a signal, which controls each of the color pixels of the pixel array 110. For example, the row driver 120 may output a signal, which resets a photosensitive element of each color pixel or controls the photosensitive element to output an electrical signal corresponding to photocharge accumulated therein.

The row driver 120 may select one of the rows of the pixel array 110 in response to a row address signal output from the controller 140. The read circuit 130 may receive an electrical signal from the pixel array 110 and output a pixel value (or pixel data). For example, the read circuit 130 may include an analog-to-digital converter (ADC) and output, as pixel data, a digital signal corresponding to an analog signal received from the pixel array 110. The read circuit 130 may output a light detection signal in units of columns from the pixels arranged in the selected row. To this end, the read circuit 130 may include a column decoder and an analog-to-digital converter (ADC).

For example, the read circuit 130 may include a plurality of ADCs arranged for each column between the column decoder and the pixel array 110, or a single ADC arranged at an output end of the column decoder. The controller 140, the row driver 120, and the read circuit 130 may be implemented by a single chip or separate chips. A processor configured to process image signals output through the read circuit 130 may be implemented by a single chip with the controller 140, the row driver 120, and the read circuit 130.

The pixel array 110 may include a plurality of pixels that detect light of different wavelengths, and the pixels may be arranged in various manners. A micro lens array may be disposed on the pixel array 110.

Although not shown in FIG. 1, pixel data of the image sensor 100 may be provided to an image processing unit or system or an image signal processor (ISP), and a processing operation such as compensation or correction may be performed by the image processing unit based on digital signal processing. According to example embodiments, it may be defined that a processing operation such as compensation or correction is performed by an element (e.g., a processor) of the image sensor 100 or by a separate processing unit outside the image sensor 100.

Figure 2:
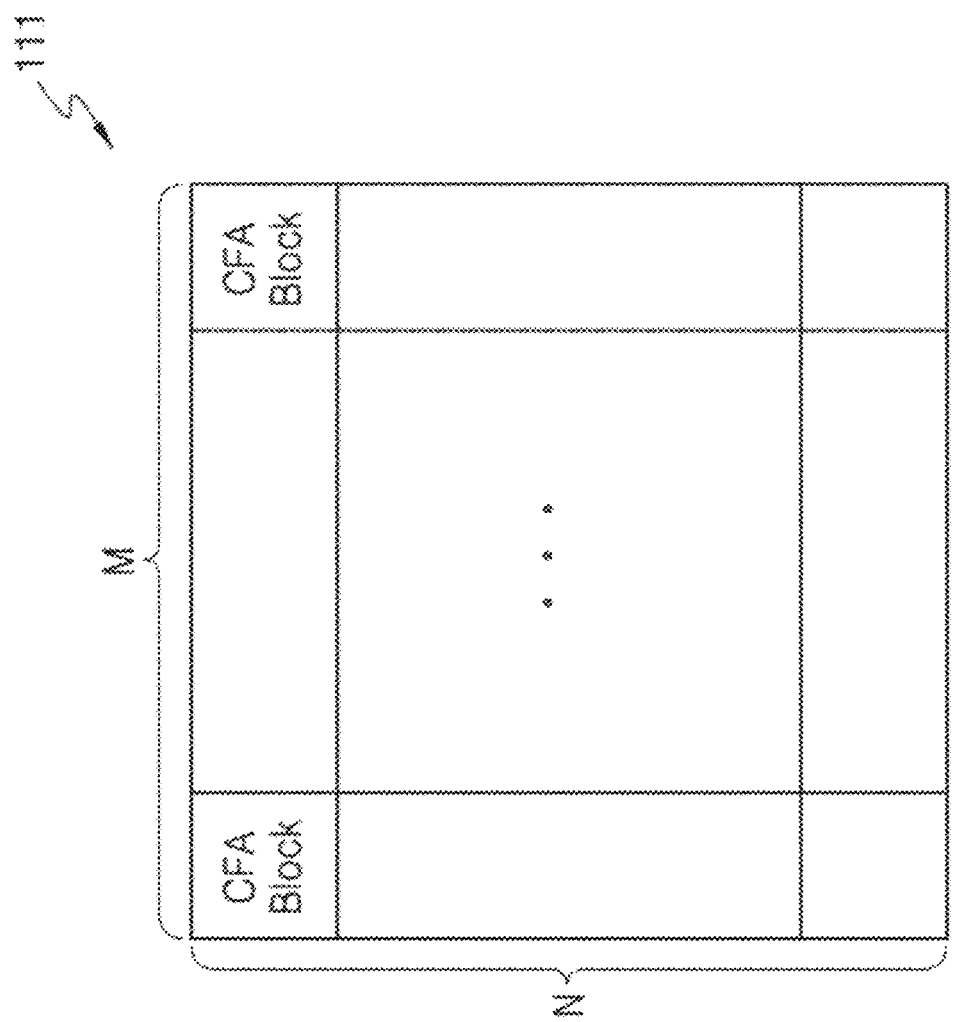
FIG. 2 is a diagram of a pixel array according to an exemplary embodiment of the present inventive concept.

FIG. 2 is a diagram of an example embodiment of a pixel array. Referring to FIGS. 1 through 2, the MIS 100 (or a non-multi-spectral imaging sensor) may include the pixel array 110, and a color filter array (CFA) may be provided in the pixel array 110 to allow a certain color to be sensed by each pixel. In the description of example embodiments below, the terms "color filter", "color pixel", "filter array", and "pixel array" may be variously defined. For example, a CFA may be defined as a separate element provided on a pixel array including a photosensitive element or as being included in a pixel array. In other words, a color pixel may be defined as including a corresponding color filter. In the description of example embodiments below, each of a CFA cell and a CFA block may be defined as including a color pixel.

The pixel array 110 may include a plurality of CFA cells 111, which are defined in a certain unit. For example, the pixel array 110 may include a plurality of CFA cells 111 in length and width directions. Each of the CFA cells 111 may include color pixels having a certain size.

Each of the CFA cells 111 may be defined including a plurality of CFA blocks and may refer to a minimum structure of the same CFA blocks. FIG. 2 shows as in some example embodiments, in which a CFA cell 111 includes M*N CFA blocks, such that the CFA cell 111 includes M CFA blocks in the width direction and N CFA blocks in the length direction (M and N being positive integers). The number of color pixels may increase in a high-definition image sensor such as a CMOS image sensor (CIS), and accordingly, the size of the CFA cell 111 and the size of a CFA block may increase.

Figure 3:
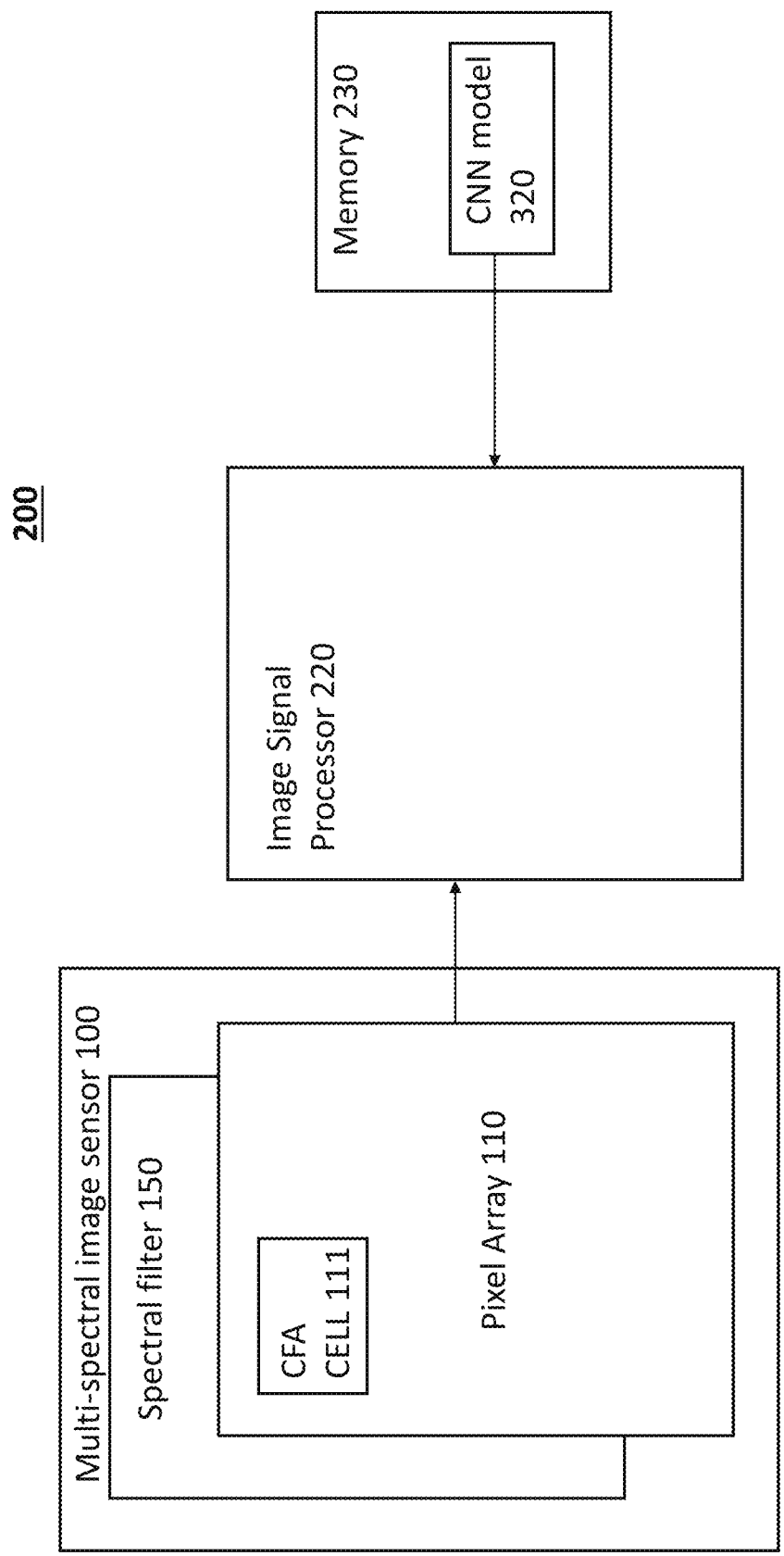
FIG. 3 illustrates an image processing unit according to an exemplary embodiment of the present inventive concept.

FIG. 3 is a block diagram of an example of an image processing unit (or image processing system) including an image sensor, according to some example embodiments.

Referring to FIG. 3, an image processing unit 200 may include the multi-spectral image sensor 100 (or a non-multi-spectral image sensor), an image signal processor (ISP) 220, and a memory 230. The pixel array 110 includes one or more CFA cells 111. The image signal processor (ISP) 220 performs image processing using pixel values from the pixel array 110 and a CNN model 320 stored in memory 230. According to some example embodiments, the image sensor described above may be defined as including the pixel array 110 and at least some of configurations of the image signal processor 220.

FIG. 4 illustrates the spectral filter 150 of FIG. 1 according to an exemplary embodiment. The spectral filter 150 may include a plurality of filters arranged in two dimensions. FIG. 4 illustrates sixteen unit filters F1 to F16 arranged in a 4×4 array as an example, but the inventive concept is not limited thereto as various number of unit filters and arrangements are possible. For example, unit filter F1 may filter out light having a range of frequencies with a center frequency of 400 nm, unit filter F2 may filter out light having a range of frequencies with a center frequency of 440 nm, unit Filter F3 may filter out light having a range of frequencies with a center frequency of 480 nm, etc. The pixel array 110 includes a plurality of pixels respectively corresponding to the unit filters provided in the spectral filter 150. The spectral filter 150 may be a Fabry-Perot filter as an example or omitted entirely.

Figure 5:
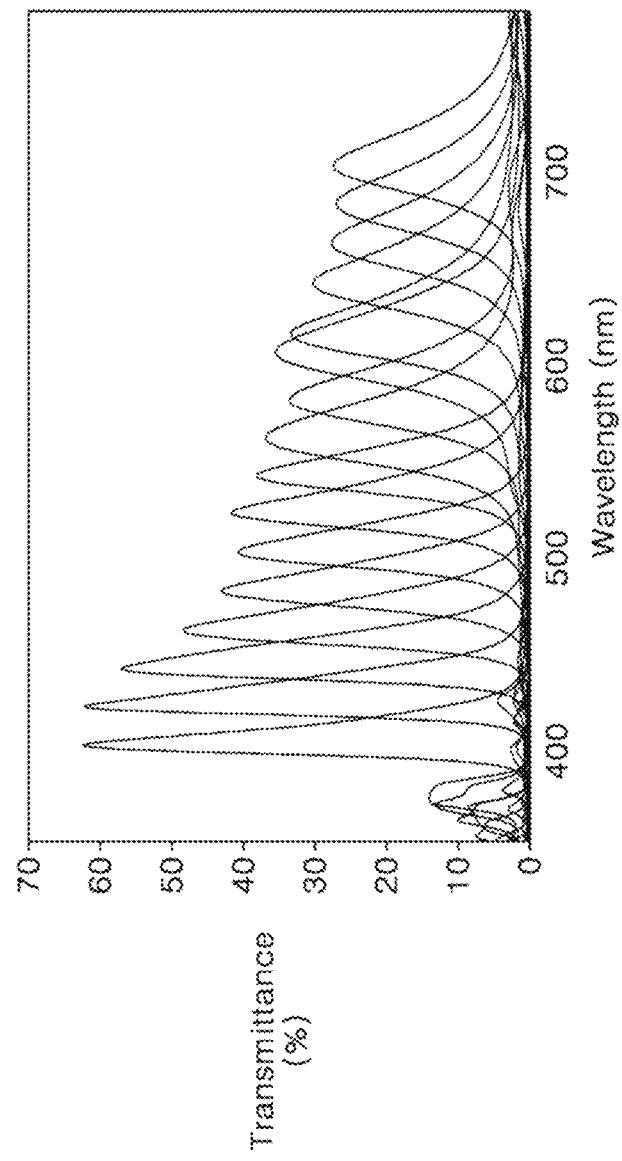
FIG. 5 illustrates transmittance spectrums of the spectral filter of FIG. 4.

FIG. 5 shows exemplary transmittance spectrums of the first to sixteenth unit filters F1 to F16. As shown in FIG. 5, the first to sixteenth unit filters F1 to F16 may effectively implement their respective center frequencies in a range from about 400 nm to about 700 nm.

Figure 6:
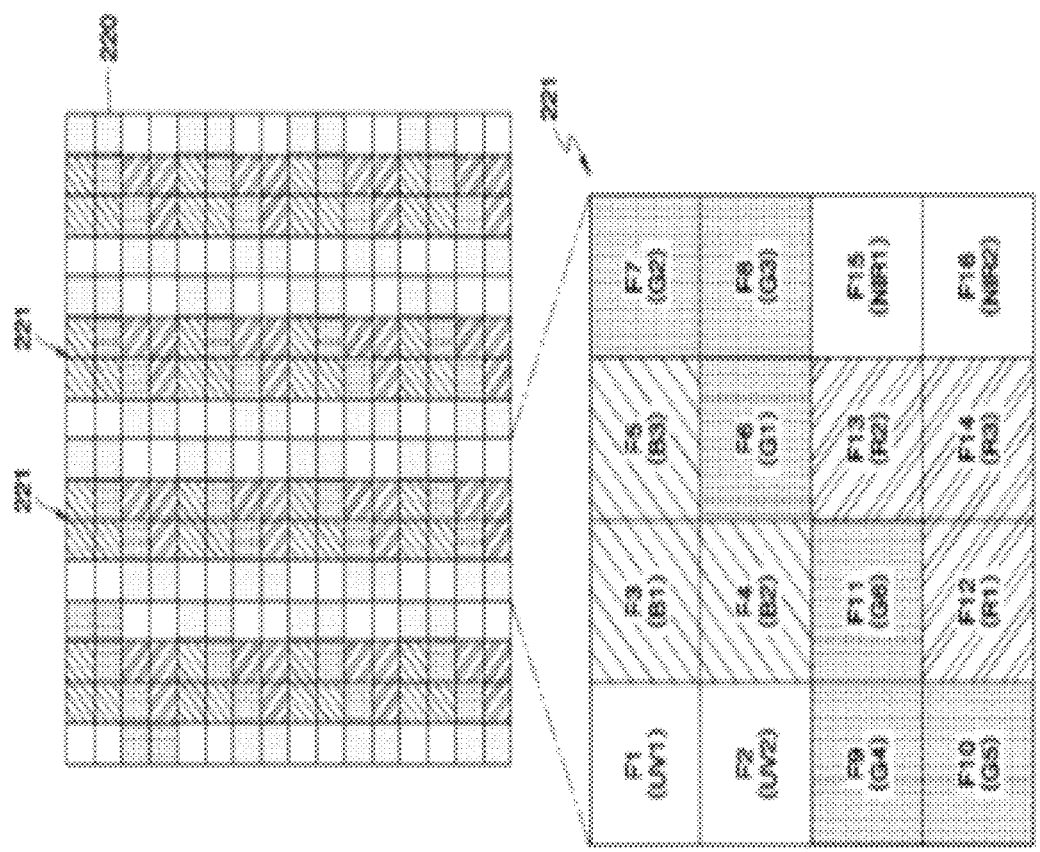
FIG. 6 illustrates an exemplary spectral filter of the image sensor.

FIG. 6 illustrates an embodiment of the spectral filter 150 of FIG. 1. Referring to FIG. 6, a spectral filter 220 includes a plurality of filter groups arranged in a two-dimensional (2D) array. Each filter group 221 may include 16 unit filters F1 to F16 arranged in a 4×4 array. For example, unit filters F1 and F2, may transmit ultraviolet light, filters F15 and F16 may transmit infrared light, and the remaining unit filters may transmit visible light of different colors. Unit filters provided in the spectral filter 220 may have a resonance structure having two reflection plates, and a transmitted wavelength band may be determined according to characteristics of the resonance structure. The transmission wavelength band may be adjusted according to a material of the reflection plate, a material of a dielectric material in a cavity, and a thickness of the cavity. In addition, a structure using a grating, a structure using a distributed Bragg reflector (DBR), etc. may be applied to a unit filter. Furthermore, pixels of the sensor 100 may be arranged in various ways according to color characteristics of the sensor 100. A multispectral image from the MIS 100 can be formed after performing a demosaicing of raw pixel signals.

Figure 7:
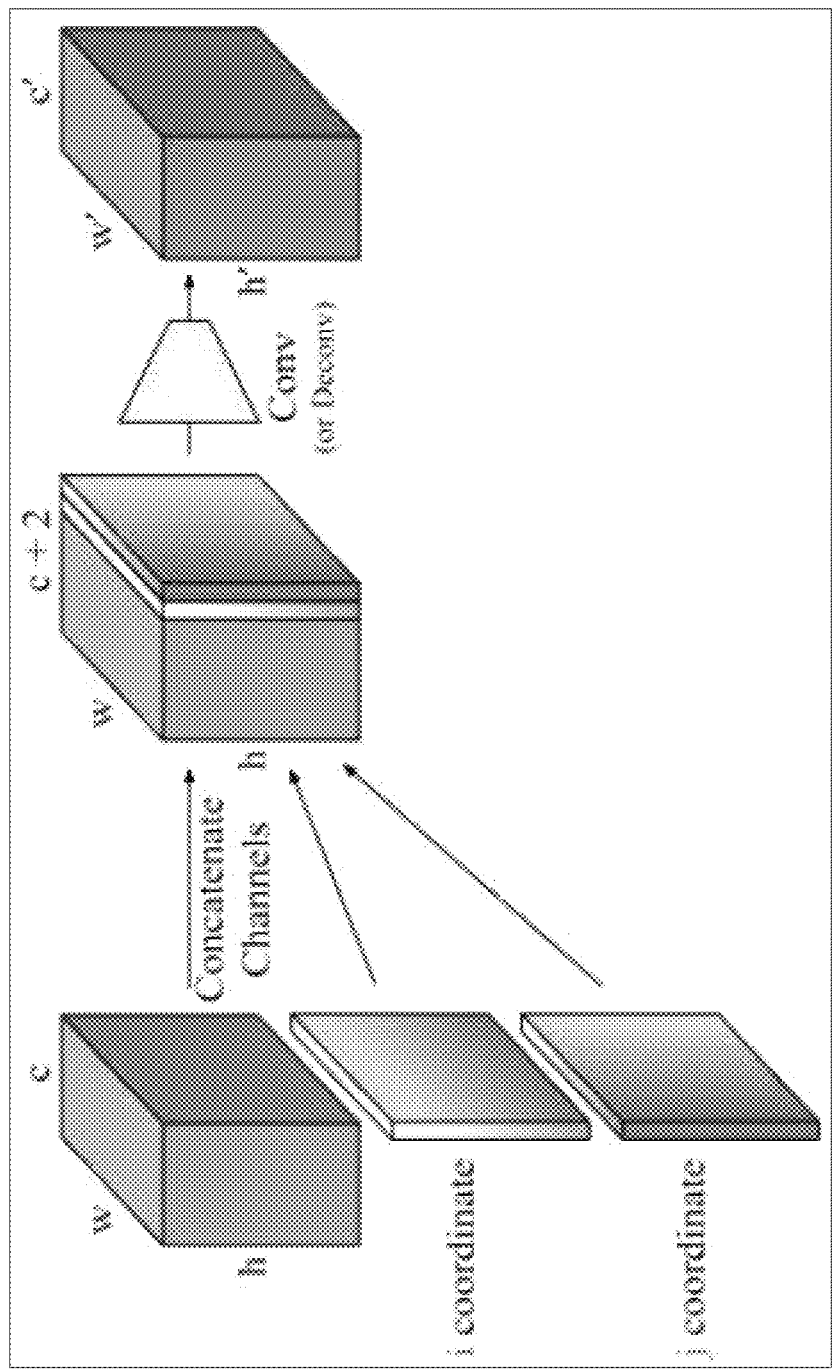
FIG. 7 illustrates a CoordConv architecture.

In an exemplary embodiment, the image signal processor 220 utilizes a spatially dependent convolutional neural network (CNN) to predict cross-talk and CRA components in a multi-spectral image signal, thereby allowing them to be corrected. The CNN may be derived from a ResNet architecture. In an embodiment, the CNN is of type CoordConv, which aims to solve spatially variant problems by modifying equivariant convolutional layers. It works by giving the convolution access to its own input coordinates through the use of extra coordinate channels. CoordConv allows networks to learn either complete translation invariance or varying degrees of translation dependence, as required by the end task. FIG. 7 illustrates the CoordConv architecture. A CoordConv neural network according to an exemplary embodiment takes an input tensor of size C×H×W that represents a patch from an image and concatenates two additional layers (e.g., one containing the x coordinate for each pixel in the input tensor and the other containing the y coordinate for each pixel in the input tensor). The two layers give the network local information about the input tensor. After concatenating those two layers, the tensor size becomes (C+2)×H×W and it then goes through a convolutional layer that outputs a C'×H'×W' tensor according to convolutional parameters. However, the inventive concept is not limited to a CNN of the type CoordConv and may be replaced with another CNN such as a U-Net or another artificial neural network.

Assuming an ideal sensor and light source, the intensity of a pixel located at (x, y) coordinates, can be expressed by Equation 1 as follows:

$$I(x,y) = \int S(\lambda,x,y) \cdot R(\lambda,x,y) \cdot \rho(\lambda) d\lambda \qquad \text{[Equation 1]}.$$

In Equation 1, $\lambda$ is wavelength, $S(\lambda,x,y)$ is the incoming illumination spectrum of the pixel, $R(\lambda,x,y)$ is the reflectance spectrum, and $\rho(\lambda)$ is the sensor spectral response function. CRA shift in an MIS leads to a different behavior of pixels according to their location in the image, so the sensor response becomes also dependent to the pixel location as shown in Equation 2.

$$\rho(\lambda) \rightarrow \rho(\lambda,x,y) \qquad \text{[Equation 2]}.$$

Consideration of the CRA shift effect results in Equation 3 for pixel intensity.

$$I(x,y) = \int S(\lambda,x,y) \cdot R(\lambda,x,y) \cdot \rho(\lambda,x,y) d\lambda \qquad \text{[Equation 3]}$$

The cross-talk phenomenon adds some unknown influence of every pixel in an environment $\Omega(x,y)$ of each pixel to its intensity. This addition can be expressed by Equation 4.

$$\Sigma_{j,k \in \Omega(x,y)} a_{x,y,k,j} \int S(\lambda,x,y) \cdot R(\lambda,x,y) \cdot \rho(\lambda,x+j,y+k) d\lambda \qquad \text{[Equation 4]}.$$

In Equation 4, $a_{x,y,k,j}$ is a coefficient that depends on the source pixel and its immediate environment. The expression for pixel intensity can then be expressed by $I(x,y) = \int S(\lambda,x,y) \cdot R(\lambda,x,y) \cdot \rho(\lambda,x,y) d\lambda + \Sigma_{j,k \in \Omega(x,y)} a_{x,y,k,j} \int S(\lambda,x,y) \cdot R(\lambda,x,y) \cdot \rho(\lambda,x+j,y+k) d\lambda$.

As seen, the measured intensity depends on the signal at the pixel and its surroundings, the sensor response in each pixel and the cross-talk model of the sensor.

Figure 8:
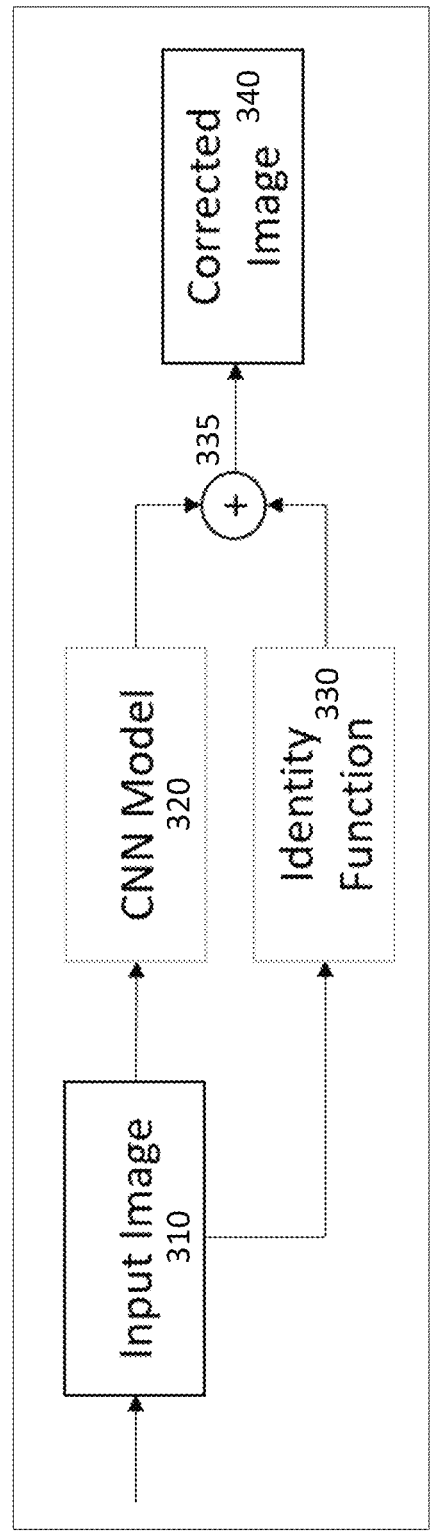
FIG. 8 illustrates a signal processing pipeline for correcting an image using a convolutional neural network (CNN)

FIG. 8 illustrates a signal processing pipeline for correcting an image or image data using a CNN according to an embodiment of the inventive concept. However, the inventive concept is not limited to use of a CNN as such may be replaced with other network types such as a Generative Adversarial network (GAN). Referring to FIG. 8, the pipeline includes the CNN 320, an identify function 330, and a subtractor 335. The CNN 320 operates on an input image 310 and coordinates of pixels of the input image 320 to output an error value for each pixel of the input image 310. The identity function 330 provides original image data of the input image for each error value output, and the subtractor 335 subtracts the error value of a given pixel from the original image data of the given pixel to generate a corrected pixel of the corrected image 340.

A lens shading correction (LSC) may have been performed on an initial image to generate the input image 310. LSC is applied to improve the uniformity of lamination and color. However, residual artifacts in the input image 310 may still be present due to various factors such as CRA-shift, cross-talk, or an incorrect LSC. In an alternate embodiment, no LSC is performed to generate the input image 310, and the LSC is later performed on the corrected image 340 to generate a final corrected image.

Figure 9:
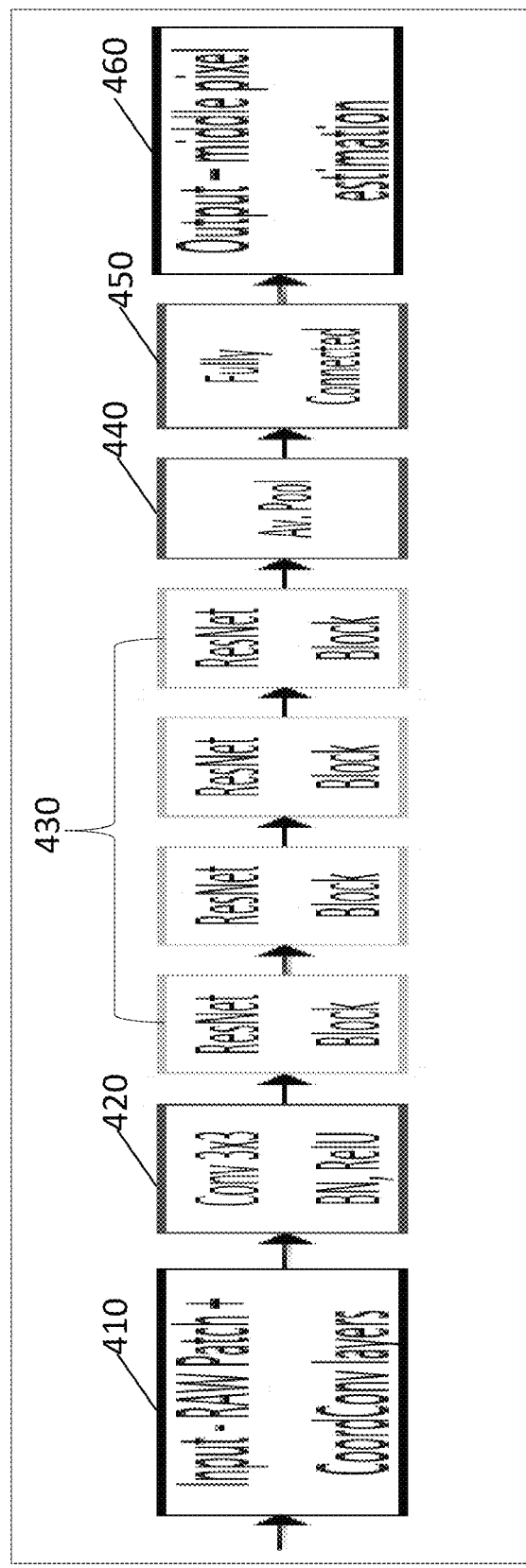
FIG. 9 illustrates the CNN according to an exemplary embodiment of the inventive concept.

FIG. 9 illustrates the CNN 320 according to an exemplary embodiment of the inventive concept. Referring to FIG. 9, the CNN 320 includes CoordConv layers 410, a rectified linear unit (ReLU) layer 420, ResNet layers 430, a global average pooling layer 440, and a fully connected layer 450 that outputs a prediction 460. In an embodiment, the prediction 460 is an error value of a center pixel of the patch, but is not limited thereto. For example, the error value could correspond to any pixel of the patch. Features of the patch and coordinates of the patch may be input to CoordConv layers 410. The CoordConv layers 410 may take an input patch from a RAW image and concatenate the x-y coordinates layers. In layer 420, a convolution is performed between the input and a convolution kernel of size 3×3, and then every value of the output goes through a ReLU function, and then it performs a batch normalization (BN). The BN may cause each mini-batch to have a mean of zero and a standard deviation of one. In layer 430, a sequence of convolutions may be performed to generate an output that can be added to the input tensor or a rescaled tensor of the input. In layer 450, it may flatten the input tensor to have one dimension for each sample, so the dimension will be (Batches-Amount)xM, and a fully-connected (FC) layer multiplies the input by a weight matrix and then adds a bias matrix, where a size of the matrix depends on the input and output shapes.

FIG. 10 illustrates a method of training the CNN 320 according to an exemplary embodiment.

The method of FIG. 10 includes generating sample images from one or more flat-field images of different wavelength (S502). Each flat-field image corresponds to a certain narrow wavelength among the illumination spectrum supported by the MIS 100. For example, the distance between the lower bound and the upper bound may be around 50-100 nm. A flat-field image may be an image of a uniformly illuminated field. For example, a flat-field image may be generated by pointing a camera at an area characterized by uniform luminosity and color and using the camera to capture a photo of the area. For example, a flat-field image could be generated for each possible color supported by the MIS 100. Further, flat-field images may be generated for non-visible wavelengths such as ultraviolet and infrared. For example, a flat-field image may have a uniform luminosity and wavelength.

One of the sample images may a single one of the flat-field images, or a combination of two or more of the flat-field images. The combination could be a weighted average of the two or more flat-field images of different illuminations and/or wavelength. The flat-field images of the combination could be weighted equally or differently. A sample image may also be generated by splicing together different parts of the two or more flat-field images. For example, a sample image could be generated by splicing together an upper half of a first of the flat-field images with a lower half of a second one of the flat-field images.

The method of FIG. 10 further includes inputting one of the sample images and coordinates of pixels of the sample image to the CNN (S503). In an alternate embodiment, the coordinates of the pixels are not additionally input to the CNN.

Then, the method of FIG. 10 operates the CNN on a receptive patch of the sample image and the coordinates of the receptive patch to learn an error value of a center pixel of the receptive patch (S504). The receptive patch is smaller than the sample image. For example, the receptive patch could a rectangular or squared shaped portion of the sample image such as 32×32 pixels, 64×64 pixels, etc. The CNN may be a CoordConv type or be of a U-net type. In an alternate embodiment where the CNN is not of type Coord-Conv, only the receptive patch is input to the CNN (i.e., the CNN does not operate on the coordinates).

Next, the method of FIG. 10 updates weights of the CNN using the learned error value (S505).

Steps S504 and S505 may then be repeated for other receptive patches of the input sample image. For example, if the sample image is divided into sixteen patches, and step S506 determines that only the first patch has been operated on so far, the method of FIG. 10 resumes to step S404 to operate on the second patch. If step S506 determines that the last patch has been processed, steps S503-S505 are repeated for the rest of the sample images. If step S507 determines that the last sample image has been processed, the training may terminate.

The training may additionally include training the CNN 320 on real world images as illustrated in the method of FIG. 11. The method of FIG. 11 is the same as the method of FIG. 10, except its first step is replaced with a step of inputting a real world image to the CNN 320 (S602). The real world image can be any image and typically differs from a flat-field image. A real world image may differ from a flat-field image in that it need not have a uniform lumosity or wavelength.

Once the CNN 320 is trained, during an inference stage, a new image 310 is input to the CNN 320 as shown in FIG. 8. In an embodiment, prior to inputting the new image 310, LSC is performed on the new image 310. For example, the CNN 320 may process each patch of the new image 310 and its respective coordinates to determine error values of center pixels of each patch. Then, the new image 310 can be corrected using the error values. For example, the error value of a given pixel of the new image can be subtracted from the original intensity of the given pixel or added to the original intensity and this can be repeated for each of the determined error values to generate the corrected image 340. Artifacts in the new image 310, for example, due to CRA shift, cross-talk, etc. should no longer be visible in the corrected image 340. The usage of the CoordConv architecture in the CNN 320 enables correction of cross-talk and CRA shift effects spatially. However, if artifacts are still visible, LSC may be performed on the corrected image 340 to generate a final corrected image.

Figure 12A:
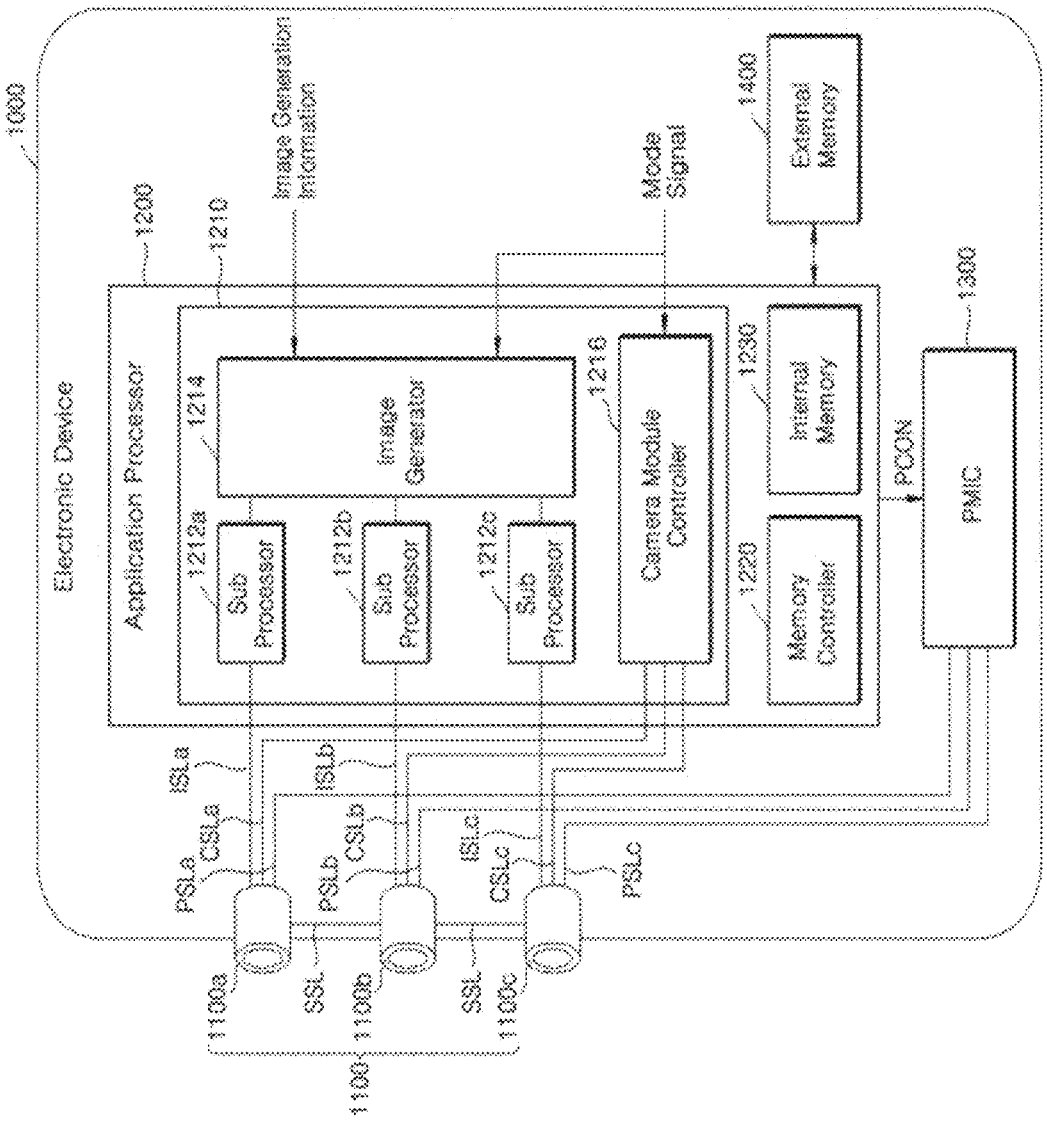
FIGS. 12A and 12B are block diagrams of an electronic device including a multi-camera module using an image sensor, according to some example embodiments.
Figure 12B:
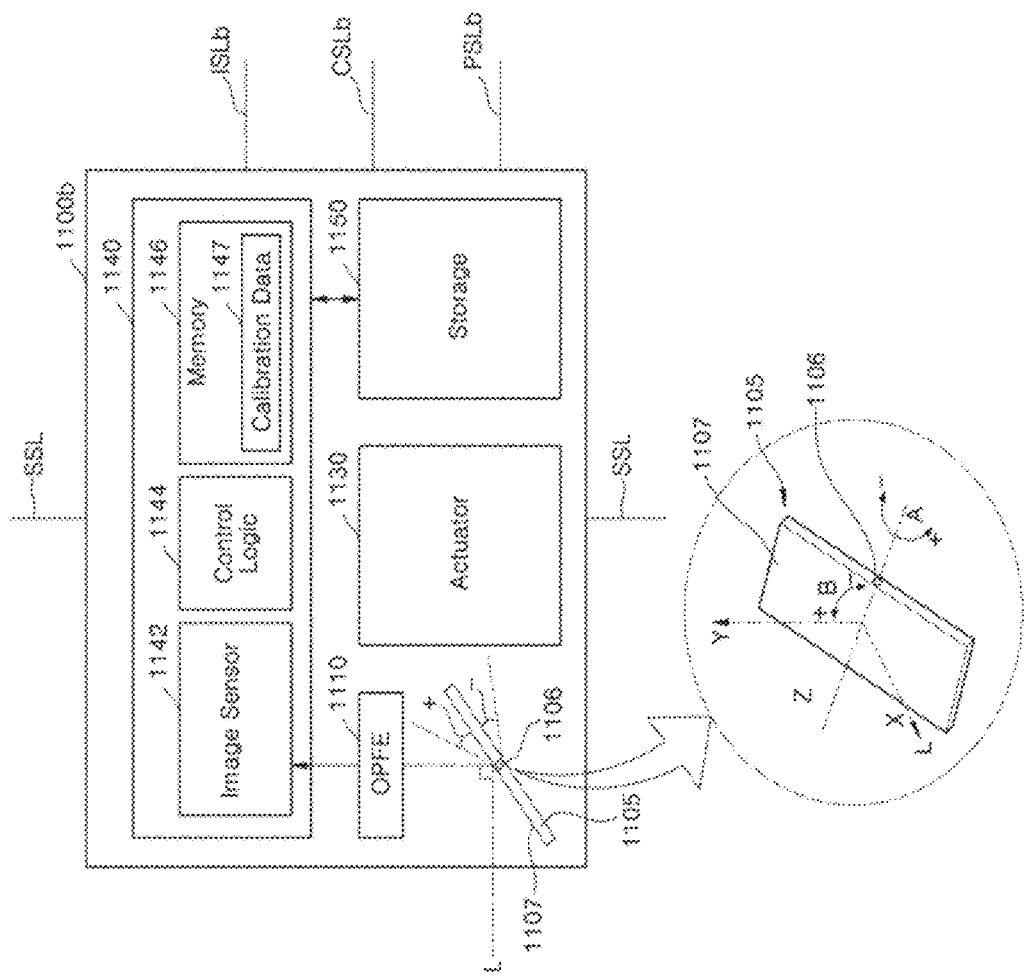

FIG. 12A is a block diagram of an electronic device including a multi-camera module using an image sensor, according to some example embodiments. FIG. 12B is a detailed block diagram of a camera module in FIG. 12A.

Referring to FIG. 12A, an electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. Although three camera modules 1100*a*, 1100*b*, and 1100*c* are illustrated in FIG. 10, example embodiments are not limited thereto. In some example embodiments, the camera module group 1100 may be modified to include only two camera modules. In some example embodiments, the camera module group 1100 may be modified to include "n" camera modules, where "n" is a natural number of at least 4.

The detailed configuration of the camera module 1100*b* will be described with reference to FIG. 12B below. The descriptions below may also applied to the other camera modules 1100*a* and 1100*c*.

Referring to FIG. 12B, the camera module 1100*b* may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from outside.

In some example embodiments, the prism 1105 may change the path of the light L incident in a first direction X into a second direction Y perpendicular to the first direction X. The prism 1105 may rotate the reflective surface 1107 of the light reflecting material in a direction A around a central shaft 1106 or rotate the central shaft 1106 in a direction B so that the path of the light L incident in the first direction X is changed into the second direction Y perpendicular to the first direction X. At this time, the OPFE 1110 may move in a third direction Z, which is perpendicular to the first and second directions X and Y.

In some example embodiments, an A-direction maximum rotation angle of the prism 1105 may be less than or equal to 15 degrees in a plus (+) A direction and greater than 15 degrees in a minus (−) A direction, but embodiments are not limited thereto.

In some example embodiment, the prism 1105 may move by an angle of about 20 degrees or in a range from about 10 degrees to about 20 degrees or from about 15 degrees to about 20 degrees in a plus or minus B direction. At this time, an angle by which the prism 1105 moves in the plus B direction may be the same as or similar, within a difference of about 1 degree, to an angle by which the prism 1105 moves in the minus B direction.

In some example embodiments, the prism 1105 may move the reflective surface 1107 of the light reflecting material in the third direction Z parallel with an extension direction of the central shaft 1106.

The OPFE 1110 may include, for example, "m" optical lenses, where "m" is a natural number. The "m" lenses may move in the second direction Y and change an optical zoom ratio of the camera module 1100b. For example, when the default optical zoom ratio of the camera module 1100b is Z, the optical zoom ratio of the camera module 1100b may be changed to 3Z, 5Z, or greater by moving the "m" optical lenses included in the OPFE 1110.

The actuator 1130 may move the OPFE 1110 or an optical lens to a certain position. For example, the actuator 1130 may adjust the position of the optical lens such that an image sensor 1142 is positioned at a focal length of the optical lens for accurate sensing.

The image sensing device 1140 may include the image sensor 1142, a control logic 1144, and a memory 1146. The image sensor 1142 may sense an image of an object using the light L provided through the optical lens. According to some example embodiments described above, the image sensor 1142 may include a pixel array, and a color pattern of a plurality of color pixels of the pixel array may follow the patterns of a CFA cell, a CFA block, and a sub block in some example embodiments described above.

The control logic 1144 may generally control operations of the camera module 1100b. For example, the control logic 1144 may control operation of the camera module 1100b according to a control signal provided through a control signal line CSLb.

The memory 1146 may store information, such as calibration data 1147, necessary for the operation of the camera module 1100b. The calibration data 1147 may include information, which is necessary for the camera module 1100b to generate image data using the light L provided from outside. For example, the calibration data 1147 may include information about the degree of rotation described above, information about a focal length, information about an optical axis, or the like. When the camera module 1100h is implemented as a multi-state camera that has a focal length varying with the position of the optical lens, the calibration data 1147 may include a value of a focal length for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some embodiments, the storage 1150 may include electrically erasable programmable read-only memory (EEPROM), but embodiments are not limited thereto.

In some example embodiments, each of the camera modules 1100a, 1100b, and 1100c may include the actuator 1130. Accordingly, the camera modules 1100a, 1100b, and 1100c may include the calibration data 1147, which is the same or different among the camera modules 1100a, 1100b, and 1100c according to the operation of the actuator 1130 included in each of the camera modules 1100a, 1100b, and 1100c.

In some example embodiments, one (e.g., the camera module 1100b) of the camera modules 1100a, 1100b, and 1100c may be of a folded-lens type including the prism 1105 and the OPFE 1110 while the other camera modules (e.g., the camera modules 1100a and 1100c) may be of a vertical type that does not include the prism 1105 and the OPFE 1110. However, example embodiments are not limited thereto.

In some example embodiments, one (e.g., the camera module 1100c) of the camera modules 1100a, 1100b, and 1100c may include a vertical depth camera, which extracts depth information using an infrared ray (IR). In this case, the application processor 1200 may generate a three-dimensional (3D) depth image by merging image data provided from the depth camera with image data provided from another camera module (e.g., the camera module 1100a or 1100b).

In some example embodiments, at least two camera modules (e.g., 1100a and 1100b) among the camera modules 1100a, 1100b, and 1110c may have different field-of-views. In this case, the two camera modules (e.g., 1100a and 1100b) among the camera modules 1100a, 1100b, and 1100c may respectively have different optical lenses, but embodiments are not limited thereto.

In some example embodiments, the camera modules 1100a, 1100b, and 1100c may have different field-of-views from one another. In this case, the camera modules 1100a, 1100b, and 1100c may respectively have different optical lenses, but embodiments are not limited thereto.

In some example embodiments, the camera modules 1100a, 1100b, and 1100c may be physically separated from one another. In other words, the sensing area of the image sensor 1142 is not divided and used by the camera modules 1100a, 1100b, and 1100c, but the image sensor 1142 may be independently included in each of the camera modules 1100a, 1100b, and 1100c.

Referring back to FIG. 12A, the application processor 1200 may include an image processing unit 1210, a memory controller 1220, and an internal memory 1230. The application processor 1200 may be separately implemented from the camera modules 1100a, 1100b, and 1100c. For example, the application processor 1200 and the camera modules 1100a, 1100b, and 1100c may be implemented in different semiconductor chips.

The image processing unit 1210 may include a plurality of sub processors 1212a, 1212b, and 1212c, an image generator 1214, and a camera module controller 1216.

The image processing unit 1210 may include as many sub processors 1212a, 1212b, and 1212c as the camera modules 1100a, 1100b, and 1100c.

Image data generated from each camera module 1100a, 1100b, or 1100c may be provided to a corresponding one of the sub processors 1212a, 1212b, and 1212c through a corresponding one of separate image signal lines ISLa, ISLb, and ISLc. For example, image data generated from the camera module 1100a may be provided to the sub processor 1212a through the image signal line IS La, image data generated from the camera module 1100*b* may be provided to the sub processor 1212*b* through the image signal line ISLb, and image data generated from the camera module 1100*c* may be provided to the sub processor 1212*c* through the image signal line ISLc. Such image data transmission may be performed using, for example, a mobile industry processor interface (MIPI) based camera serial interface (CSI), but embodiments are not limited thereto.

In some example embodiments, a single sub processor may be provided for a plurality of camera modules. For example, differently from FIG. 12A, the sub processors 1212*a* and 1212*c* may not be separated but may be integrated into a single sub processor, and the image data provided from the camera module 1100*a* or the camera module 1100*c* may be selected by a selection element (e.g., a multiplexer) and then provided to the integrated sub processor.

The image data provided to each of the sub processors 1212*a*, 1212*b*, and 1212*c* may be provided to the image generator 1214. The image generator 1214 may generate an output image using the image data provided from each of the sub processors 1212*a*, 1212*b*, and 1212*c* according to image generation information or a mode signal.

In detail, the image generator 1214 may generate the output image by merging at least portions of respective pieces of image data, which are respectively generated from the camera modules 1100*a*, 1100*b*, and 1100*c* having different field-of-views, according to the image generation information or the mode signal. Alternatively or additionally, the image generator 1214 may generate the output image by selecting one of pieces of image data, which are respectively generated from the camera modules 1100*a*, 1100*b*, and 1100*c* having different field-of-views, according to the image generation information or the mode signal.

In some example embodiments, the image generation information may include a zoom signal or a zoom factor. In some example embodiments, the mode signal may be based on a mode selected by a user.

When the image generation information includes a zoom signal or a zoom factor and the camera modules 1100*a*, 1100*b*, and 1100*c* have different field-of-views, the image generator 1214 may perform different operations according to different kinds of zoom signals. For example, when the zoom signal is a first signal, the image generator 1214 may merge image data output from the camera module 1100*a* with image data output from the camera module 1100*c* and then generate an output image using a merged image signal and image data output from the camera module 1100*b*, which has not been used in the merging. When the zoom signal is a second signal different from the first signal, the image generator 1214 may not perform this image data merging but select one of pieces of image data respectively output from the camera modules 1100*a* through 1100*c* to generate an output image. However, example embodiments are not limited thereto, and a method of processing image data may be changed whenever necessary.

In some example embodiments, the image generator 1214 may receive a plurality of pieces of image data, which have different exposure times, from at least one of the sub processors 1212*a*, 1212*b*, and 1212*c* and perform high dynamic range (HDR) processing on the pieces of image data, thereby generating merged image data having an increased dynamic range.

The camera module controller 1216 may provide a control signal to each of the camera modules 1100*a*, 1100*b*, and 1100*c*. A control signal generated by the camera module controller 1216 may be provided to a corresponding one of the camera modules 1100*a*, 1100*b*, and 1100*c* through a corresponding one of control signal lines CSLa, CSLb, and CSLc, which are separated from one another.

One (e.g., the camera module 1100*b*) of the camera modules 1100*a*, 1100*b*, and 1100*c* may be designated as a master camera according to the mode signal or the image generation signal including a zoom signal, and the other camera modules (e.g., 1100*a* and 1100*c*) may be designated as slave cameras. Such designation information may be included in a control signal and provided to each of the camera modules 1100*a*, 1100*b*, and 1100*c* through a corresponding one of the control signal lines CSLa, CSLb, and CSLc, which are separated from one another.

A camera module operating as a master or a slave may be changed according to a zoom factor or an operation mode signal. For example, when the field-of-view of the camera module 1100*a* is greater than that of the camera module 1100*b* and the zoom factor indicates a low zoom ratio, the camera module 1100*b* may operate as a master and the camera module 1100*a* may operate as a slave. Contrarily, when the zoom factor indicates a high zoom ratio, the camera module 1100*a* may operate as a master and the camera module 1100*b* may operate as a slave.

In some example embodiments, a control signal provided from the camera module controller 1216 to each of the camera modules 1100*a*, 1100*b*, and 1100*c* may include a sync enable signal. For example, when the camera module 1100*b* is a master camera and the camera modules 1100*a* and 1100*c* are slave cameras, the camera module controller 1216 may transmit the sync enable signal to the camera module 1100*b*. The camera module 1100*b* provided with the sync enable signal may generate a sync signal based on the sync enable signal and may provide the sync signal to the camera modules 1100*a* and 1100*c* through a sync signal line SSL. The camera modules 1100*a*, 1100*b*, and 1100*c* may be synchronized with the sync signal and may transmit image data to the application processor 1200.

In some example embodiments, a control signal provided from the camera module controller 1216 to each of the camera modules 1100*a*, 1100*b*, and 1100*c* may include mode information according to the mode signal. The camera modules 1100*a*, 1100*b*, and 1100*c* may operate in a first operation mode or a second operation mode in relation with a sensing speed based on the mode information.

In the first operation mode, the camera modules 1100*a*, 1100*b*, and 1100*c* may generate an image signal at a first speed (e.g., at a first frame rate), encode the image signal at a second speed higher than the first speed (e.g., at a second frame rate higher than the first frame rate), and transmit an encoded image signal to the application processor 1200. At this time, the second speed may be at most 30 times the first speed.

The application processor 1200 may store the received image signal. e.g., the encoded image signal, in the internal memory 1230 therein or the external memory 1400 outside the application processor 1200. Thereafter, the application processor 1200 may read the encoded image signal from the internal memory 1230 or the external memory 1400, decode the encoded image signal, and display image data generated based on a decoded image signal. For example, a corresponding one of the sub processors 1212*a*, 1212*b*, and 1212*c* of the image processing unit 1210 may perform the decoding and may also perform image processing on the decoded image signal.

In the second operation mode, the camera modules 1100*a*, 1100*b*, and 1100*c* may generate an image signal at a third speed lower than the first speed (e.g., at a third frame rate lower than the first frame rate) and transmit the image signal to the application processor 1200. The image signal provided to the application processor 1200 may not have been encoded. The application processor 1200 may perform image processing on the image signal or store the image signal in the internal memory 1230 or the external memory 1400.

The PMIC 1300 may provide power, e.g., a power supply voltage, to each of the camera modules 1100*a*, 1100*b*, and 1100*c*. For example, under the control of the application processor 1200, the PMIC 1300 may provide first power to the camera module 1100*a* through a power signal line PSLa, second power to the camera module 1100*b* through a power signal line PSLb, and third power to the camera module 1100*c* through a power signal line PSLc.

The PMIC 1300 may generate power corresponding to each of the camera modules 1100*a*, 1100*b*, and 1100*c* and adjust the level of the power, in response to a power control signal PCON from the application processor 1200. The power control signal PCON may include a power adjustment signal for each operation mode of the camera modules 1100*a*, 1100*b*, and 1100*c*. For example, the operation mode may include a low-power mode. At this time, the power control signal PCON may include information about a camera module to operate in the low-power mode and a power level to be set. The same or different levels of power may be respectively provided to the camera modules 1100*a*, 1100*b*, and 1100*c*. The level of power may be dynamically changed.

It will be understood that some or all of any of the devices, controllers, generators, decoders, units, modules, circuits, processors, or the like according to any of the example embodiments as described herein, including some or all of any of the elements of the controller 140 and read circuit 130 shown in FIG. 1, the image processor 220 shown in FIG. 3, the application processor 1200 and its sub elements shown in FIG. 12A, the image sensing device 1140 and its sub elements shown in FIG. 12B, any combination thereof, or the like may be included in, may include, and/or may be implemented by one or more instances of processing circuitry such as hardware including logic circuits, a hardware/software combination such as a processor executing software; or a combination thereof. In some example embodiments, said one or more instances of processing circuitry may include, but are not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, any of the memories, memory units, or the like as described herein may include a non-transitory computer readable storage device, for example a solid state drive (SSD), storing a program of instructions, and the one or more instances of processing circuitry may be configured to execute the program of instructions to implement the functionality of some or all of any of the devices, controllers, decoders, units, modules, or the like according to any of the example embodiments as described herein, including any of the methods of operating any of same as described herein.

Although each of the elements of the controller 140 and read circuit 130 shown in FIG. 1, the image processor 220 shown in FIG. 3, the application processor 1200 and its sub elements shown in FIG. 12A, the image sensing device 1140 and its sub elements shown in FIG. 12B are illustrated as being distinct, example embodiments are not limited thereto, and some of the functions of one of the above may be performed by others of the features of the relevant figures. This may also be the case of additional elements within the above as described in example embodiments herein.

While the inventive concepts have been particularly shown and described with reference to embodiments thereof, it will be understood that various changes in form and details may be made therein without departing from the spirit and scope of the following claims.

What is claimed is:

1. An image processing unit, comprising:
an image sensor comprising a pixel array;
a memory storing an artificial neural network (ANN); and
an image signal processor configured to generate a predicted error value in an image pixel of an image output by sensor pixels of the pixel array based on operation of the ANN on the image and correct the image pixel by adjusting an intensity of the image pixel using the predicted error value and original image data corresponding to the image pixel,
wherein the ANN is trained on a sample image, and the image signal processor is configured to generate a predicted error value of a pixel of the sample image, wherein the sample image is a single flat-field image or a combination of a plurality of flat-field images.

2. The image processing unit of claim 1, wherein a lens shading correction is performed to generate the image.

3. The image processing unit of claim 1, wherein the image signal processor corrects the image pixel by subtracting the error value from the intensity of the image pixel.

4. The image processing unit of claim 1, wherein the single flat-field image or the plurality of flat-field images include at least one image having uniform luminosity and color.

5. The image processing unit of claim 1, wherein the single flat-field image or the plurality of flat-field images include a first image having a first range of wavelengths and a second image uniform luminosity having a second range of wavelengths distinct from the first range.

6. The image processing unit of claim 1, wherein the sample image is a weighted average of images of the single flat-field image or the plurality of flat-field images.

7. The image processing unit of claim 1, wherein the sample image includes a first part of a first image of the single flat-field image or the plurality of flat-field images and a second other part of a second image of the single flat-field image or the plurality of flat-field images.

8. The image processing unit of claim 1, wherein the ANN was also previously trained on a sample image that is a single world image distinct and different from a flat-field image, or a combination a plurality of real word image.

9. The image processing unit of claim 1, wherein the image signal processor operates the ANN by inputting a patch of the image smaller than the image and coordinates of the patch within the image to a layer of the ANN.

10. The image processing unit of claim 1, wherein the image sensor further comprises a spectral filter including a plurality of unit filters each configured to transmit light having a corresponding one of a plurality of different wavelengths.

11. The image processing unit of claim 10, wherein the different wavelengths include wavelengths of visible light, ultraviolet light, and infrared light.

12. The image processing unit of claim 1, wherein the image sensor further comprises a spectral filter with a resonance structure having two reflection plates.

13. A method for correcting an image captured by an image sensor comprising sensor pixels, comprising:
- training, by a processor, an artificial neural network (ANN) using a training image, and generate, by the processor, a predicted error value of a pixel of the training image, wherein the training image is a single flat-field image or a combination of a plurality of flat-field images;
- operating, by the processor, the ANN on a new image output by the sensor pixels of the image sensor to determine error values in image pixels of the new image; and
- correcting, by the processor, the image pixels of the new image by adjusting intensities of the image pixels using the determined error values and original image data corresponding to each of the image pixels.

14. The method of claim 13, wherein the operating comprises inputting each patch of the new image and coordinates of the corresponding patch within the new image to a layer of the ANN to generate the error values.

15. The method of claim 13, wherein the single flat-field image or the plurality of flat-field images include at least one image having uniform luminosity and color.

16. The method of claim 13, wherein the training image includes a first part of a first flat-field image and a second other part of a second flat-field image.

17. An imaging system, comprising:
- an image signal processing unit configured to train an artificial neural network (ANN) on patches of flat-field images and patches of read-world images, output error values in image pixels of an input image based on operation of the trained ANN on the input image output by sensor pixels of an image sensor, and correct the image pixels of the input image by adjusting intensities of the image pixels using the error values and original image data corresponding to each of the image pixels,
- wherein the image signal processing unit is configured to train the ANN on a sample image and to generate a predicted an error value of a pixel of the sample image based on the ANN, wherein the sample image is a single flat-field image or a combination of a plurality of flat-field images.

* * * * *